(12) United States Patent
Hashimoto et al.

(10) Patent No.: US 10,807,507 B2
(45) Date of Patent: Oct. 20, 2020

(54) SEAT CORE MATERIAL

(71) Applicant: JSP CORPORATION, Tokyo (JP)

(72) Inventors: Keiichi Hashimoto, Tochigi (JP);
Katsunori Hisamatsu, Tochigi (JP);
Atsuo Takayama, Tochigi (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 16/484,264

(22) PCT Filed: Feb. 6, 2018

(86) PCT No.: PCT/JP2018/004012
§ 371 (c)(1),
(2) Date: Aug. 7, 2019

(87) PCT Pub. No.: WO2018/147278
PCT Pub. Date: Aug. 16, 2018

(65) Prior Publication Data
US 2020/0001760 A1  Jan. 2, 2020

(30) Foreign Application Priority Data
Feb. 8, 2017 (JP) ................... 2017-021653

(51) Int. Cl.
*B60N 2/70* (2006.01)
*B29C 44/12* (2006.01)
(Continued)

(52) U.S. Cl.
CPC ............ *B60N 2/7017* (2013.01); *B29C 44/12* (2013.01); *B29C 44/34* (2013.01);
(Continued)

(58) Field of Classification Search
CPC ........ B60N 2/7017; B29C 44/12; B29C 44/34
See application file for complete search history.

(56) References Cited

U.S. PATENT DOCUMENTS 10,259,353 B2 * 4/2019 Smith .................... B60N 2/242
2011/0018329 A1 * 1/2011 Galbreath ............. B60N 2/012
297/452.18

FOREIGN PATENT DOCUMENTS

JP  6-260589  9/1994
JP  2015-174340  10/2015
(Continued)

OTHER PUBLICATIONS

International Search Report dated Apr. 10, 2018 in International Application No. PCT/JP2018/004012.

*Primary Examiner* — Anthony D Barfield
(74) *Attorney, Agent, or Firm* — Wenderoth, Lind & Ponack, L.L.P.

(57) ABSTRACT

A seat core material of the present invention is a seat core material for vehicle including: a thermoplastic resin expanded bead article; and a frame member embedded in a peripheral edge portion of the expanded bead article. The expanded bead article has two or more lightening parts in an area from a center portion as seen in a front-back direction to a rear side. A through or non-through slit is provided in a continuous part between the lightening parts or an area in front of the continuous part over a distance of 100 mm or less along a vehicle-width direction of the expanded bead article. The slit is closed at both longitudinal ends.

6 Claims, 7 Drawing Sheets

(51) Int. Cl.
*B29C 44/34* (2006.01)
*B29K 23/00* (2006.01)
*B29K 105/04* (2006.01)
*B29L 31/58* (2006.01)

(52) U.S. Cl.
CPC .... *B29K 2023/12* (2013.01); *B29K 2105/048* (2013.01); *B29L 2031/58* (2013.01)

(56) References Cited

FOREIGN PATENT DOCUMENTS

| | | |
|---|---|---|
| JP | 2016-22292 | 2/2016 |
| WO | 2016/152530 | 9/2016 |

* cited by examiner

SEAT CORE MATERIAL

TECHNICAL FIELD

The present invention relates to a seat core material for automobile seat.

BACKGROUND ART

In recent years, as a seat core material for automobile seat, there has been used a seat core material in which an expanded bead article and a frame member are integrated such that the frame member made of a metal or the like is embedded in the expanded bead article. The frame member is embedded in the expanded bead article, as a member for attachment to a vehicle body or a member for reinforcement in case of a collision.

The seat core material in which the frame member is embedded in the expanded bead article is produced as described below, for example. First, an annular or looped frame member is arranged at a predetermined position in a mold cavity. Then, expanded beads are charged in the mold cavity and are fusion-bonded to each other by heating. That is, the frame member and the expanded beads are integrally molded to produce the seat core material.

The expanded bead article generally shrinks after in-mold molding, and thus the shape of the expanded bead article becomes stable with smaller dimensions than the metal mold dimensions.

When the expanded bead article having such a shrinkage property and the annular frame member are integrally molded, the annular frame member may become deformed due to the shrinkage of the expanded bead article to cause a warp in the seat core material, mainly because the shrinkage ratio of the expanded bead article and the shrinkage ratio of the annular frame member are different. The seat core material cannot obtain the intended dimension accuracy, which causes a problem with a decrease in the accuracy of attachment of the seat core material to the vehicle.

As a measure for solving these problems with the seat core material for automobile seat, there has been proposed a method by which an expanded bead article is provided with dividing spaces to expose an annular frame member so that the parts of the expanded bead article divided by the dividing spaces independently shrink (for example, see Patent Literature 1).

CITATION LIST

Patent Literature

Patent Literature 1: WO2016/152530

SUMMARY OF INVENTION

Technical Problem

According to the proposition in Patent Literature 1, the expanded bead article is completely divided and thus the divided parts of the expanded bead article can shrink independently. However, the seat core material described in Patent Literature 1 lacks an overall sense of unity and may become bent or deformed at the time of handling.

The present invention is devised to solve the foregoing problems. An object of the present invention is to provide a seat core material with a sense of unity and a sufficient strength in which an expanded bead article becomes less deformed and the expanded bead article is very excellent in dimension accuracy even when a frame member is embedded in the foamed article and the foamed article and the frame member are integrated with each other.

Solution to Problem

The present invention provides a seat core material described below.

<1> A seat core material for vehicle including: a thermoplastic resin expanded bead article; and a frame member embedded in a peripheral edge portion of the expanded bead article, wherein the expanded bead article has two or more lightening parts in an area from a center portion as seen in a front-back direction to a rear side, a through or non-through slit is provided in a continuous part area between the lightening parts or an area in front of the continuous part over a distance of 100 mm or less along a vehicle-width direction of the expanded bead article, and the slit is closed at both longitudinal ends.

<2> The seat core material according to <1>, wherein an opening area of the slit is 5% or less of a projection area of the expanded bead article in top view of the seat core material in a mounted state.

<3> The seat core material according to <1> or <2>, wherein the frame member is annular, and the frame member is embedded in the peripheral edge portion of the thermoplastic resin expanded bead article.

<4> The seat core material according to any one of <1> to <3>, wherein the expanded bead article has the two or more continuous parts, the expanded bead article has the slit in each of areas in front of the two or more continuous parts over a distance of 100 mm or less, and the slit is arranged to form an intermittent part in the vehicle-width direction.

<5> The seat core material according to <4>, wherein an auxiliary slit is formed in parallel to the slit in front of the intermittent part in a vertical direction of the expanded bead article.

Advantageous Effects of Invention

The seat core material of the present invention is very excellent in dimension accuracy and has a sense of unity and a strength of a seat core material even when the annular frame member is embedded in and integrated with the thermoplastic resin expanded bead article.

BRIEF DESCRIPTION OF DRAWINGS

FIG. 3(A) is a cross-sectional view of a slit provided in the seat core material vertically to a perpendicular direction in a mounted state; FIG. 3(B) is a diagram of a slit with a parallelogram cross section; and FIG. 3(C) is a diagram of a slit with a trapezoidal cross section.

FIGS. 4(A) to 4(C) each illustrate an embodiment in which an auxiliary slit is formed and arranged at an intermittent part without a slit, and FIG. 4(D) illustrates an embodiment in which no auxiliary slit is formed at an intermittent part without a slit.

DESCRIPTION OF EMBODIMENTS

Figure 1:
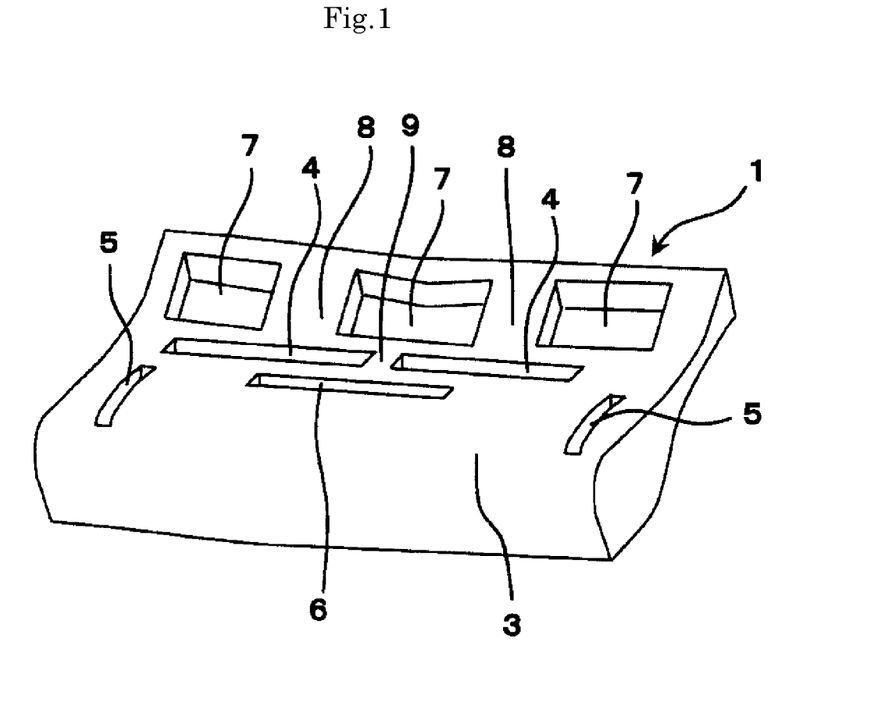
FIG. 1 is a schematic perspective view of an embodiment of a seat core material of the present invention.
Figure 2:
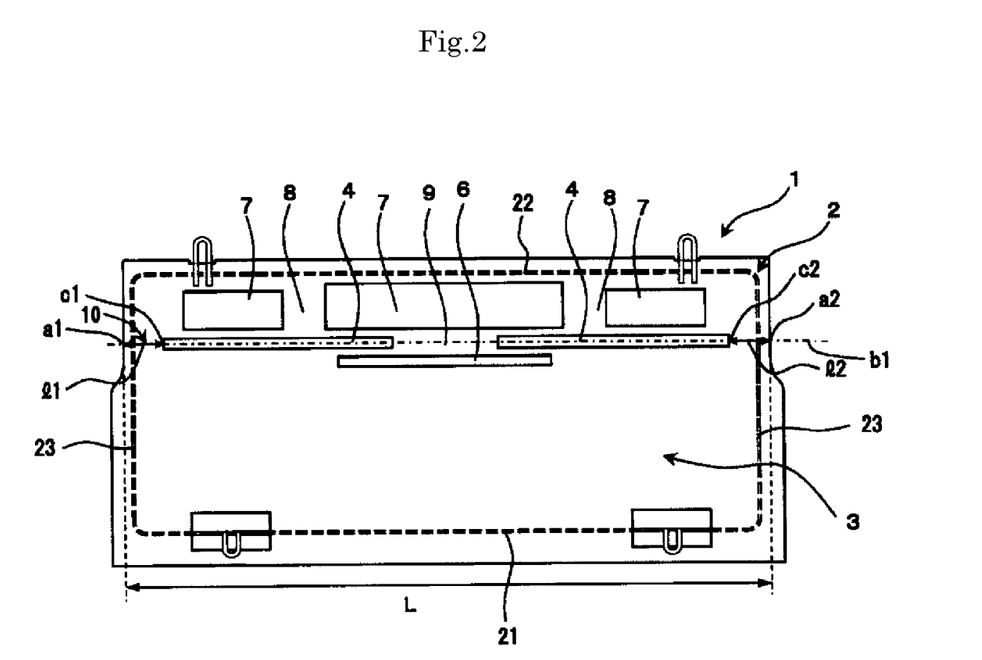
FIG. 2 is a schematic view of the embodiment of the seat core material of the present invention.

A seat core material of the present invention will be described below in detail with reference to the diagrams. FIGS. 1 and 2 are diagrams illustrating an embodiment of the seat core material of the present invention.

A seat core material 1 of the present invention includes a thermoplastic resin expanded bead article 3 (hereinafter, also called expanded bead article 3) and a frame member 2 that is embedded in a peripheral edge portion of the expanded bead article 3. The annular frame member 2 includes a front frame part 21, a rear frame part 22, and two right and left side frame parts 23 that couple the front frame part 21 and the rear frame part 22. The frame member 2 is formed in an approximately rectangular form or an approximately square form as viewed from the top, mainly along the shape of a peripheral edge of the seat core material 1. The expanded bead article 3 has two or more lightening parts 7 which is formed by removing the thickness of the expanded bead article 3, and the expanded bead article 3 has a continuous part 8 between the lightening parts 7 in an area connecting from a center portion to a rear side as seen in a front-back direction. The expanded bead article 3 has slits 4 vertically formed in the continuous part 8 or in an area in front of the continuous part 8 along a vehicle-width direction. Each of the slits 4 has longitudinal end portions closed. Each of the slits 4 is formed as a non-through slit opened at a top or bottom of the expanded bead article 3 or a slit penetrating the expanded bead article 3 in a thickness direction.

The expanded bead article 3 can be molded by a thermoplastic resin. Examples of the thermoplastic resin comprising the expanded bead article 3 include polyolefin resins such as polystyrene resin, polyethylene resin, and polypropylene resin, polyester resins such as polybutylene succinate, polyethylene terephthalate, and polylactic acid, and polycarbonate resins. In addition, examples of the thermoplastic resin comprising the expanded bead article 3 also include composite resins of polystyrene resins and polyolefin resins, mixtures of two or more of the foregoing resins, and others. Among them, polyolefin resins and composite resins of polystyrene resins and polyolefin resins are preferred from the viewpoints of light weight and strength. Among them, polyethylene resins and polypropylene resins are preferred, and polypropylene resins are more preferred. In addition, the expanded bead article 3 made from a thermoplastic resin including crystalline resins such as polyethylene and polypropylene is high in shrinkage ratio after molding, which makes it easy to obtain the advantageous effects of the present invention.

The expanded beads made from the thermoplastic resin as a material for the expanded bead article 3 is preferably multi-layer expanded beads, from the viewpoint of adhesion between a urethane material and the seat core material 1 used together for a seat. For example, the expanded beads have a multi-layer structure of a foamed core layer and a covering layer covering the foamed core layer and a resin excellent in adhesion to the urethane material is used for the covering layer, thereby to further improve the adhesion between the obtained expanded bead article 3 and the urethane material. The multi-layer expanded beads may be polyolefin resin-based multi-layer expanded beads, for example, in which the foamed core layer is made from a polyolefin resin and the covering layer is made from a mixed resin of a polyolefin resin and a polystyrene resin and/or a polyester resin. In addition, preferably, the covering layer is made from a polyolefin resin (A) and a polystyrene resin and/or a polyester resin (B), and the weight ratio of A to B is 15:85 to 90:10.

The expanded bead article 3 is formed by molding the thermoplastic resin expanded beads in a molding mold. The expanded beads can be produced by a publicly known general method for producing this kind of expanded beads. For example, to produce the polypropylene resin expanded beads, first, resin particles are dispersed in a necessary amount of dispersion medium (in general, water) by adding a surface active agent as desired to the dispersion medium in an airtight container that can be pressurized such as an autoclave. Then, the dispersion medium with the resin particles dispersed is stirred while heating and a foaming agent is fed into the resin particles to impregnate the resin particles with the foaming agent. Then, the container is held for a predetermined time while heating to form secondary crystal of the resin particles. After that, the resin particles impregnated with the foaming agent are released together with the dispersion medium from the container under high-temperature conditions to a low-pressure area (in general, under atmospheric pressure) to make the resin particle expand. In this manner, the expanded beads are obtained.

The apparent density of the expanded bead article 3 is preferably 0.015 to 0.3 g/cm$^3$. The lower limit of the apparent density of the expanded bead article 3 is more preferably 0.025 g/cm$^3$ and further preferably 0.03 g/cm$^3$ from the viewpoint of making the seat core material 1 excellent in strength and lightweight properties. The upper limit of the apparent density of the expanded bead article 3 is more preferably 0.1 g/cm$^3$ and further preferably 0.08 g/cm$^3$. In the case of using the expanded bead article 3 made from a polyolefin resin, the lower limit of the apparent density is preferably 0.018 g/cm$^3$ and more preferably 0.020 g/cm$^3$. In the case of using the expanded bead article 3 made from a polyolefin resin, the upper limit of the apparent density is preferably 0.07 g/cm$^3$ and more preferably 0.06 g/cm$^3$. The lower the apparent density of the expanded bead article 3 is, the greater the shrinkage amount of the expanded bead article 3 becomes, which makes it easy to exert the advantageous effects of the present invention.

In addition, a plurality of expanded bead articles 3 different in apparent density may be combined to form one expanded bead article 3. In this case, the average apparent density of all the expanded bead articles 3 falls within the numerical range described above. The apparent density used here can be determined by a submersion method by which the expanded bead article 3 is measured in a state of being submerged in water.

Examples of a material for the frame member 2 include metals such as iron, aluminum, and copper, and resins. From the viewpoint of improving the strength of the seat core material 1, a metal is preferred and in particular a steel material is preferred. The annular frame member 2 can have an arbitrary shape such as a linear shape, a tubular shape, and a bar shape. Among them, a bar-shaped or linear-shaped wire material with a diameter of 2 to 8 mm is preferred. The diameter of the wire material is more preferably 3 to 7 mm.

Further, the tensile strength of the wire material is preferably 200 N/mm$^2$ or more, and is more preferably 250 to 1300 N/mm$^2$, from the viewpoint of improving the strength of the seat core material 1. The yield point of the wire material is preferably 400 N/mm$^2$ or more, further preferably 440 N/mm$^2$ or more. The physical properties of the wire material can be measured in accordance with JIS G3532. The annular frame material 2 can be formed in an annular shape by welding or bending the foregoing material.

The frame member 2 does not necessarily need to be formed from only a wire material but may be formed by coupling wire materials by a metallic plate or the like, for example. The plate may have a hook portion bonded for fixing to the vehicle as necessary. The frame member 2 is preferably annular in shape as a basic structure and is further preferably approximately rectangular or approximately square in shape as viewed from the top. However, the frame member 2 can be formed such that the long side or short side parts are bent or corner parts are cut according to the seat shape or the shape of the attachment portion.

The frame member 2 is embedded in and integrated with the expanded bead article 3 and is used for improvement of the strength of the seat core material 1 and for attachment to the vehicle body. In the seat core material 1 of the present invention, as illustrated in FIG. 2, the annular frame member 2 including the front frame part 21, the rear frame part 22, and the right and left side frame parts 23 coupling the front frame part 21 and the rear frame part 22, is embedded into the expanded bead article 3.

The foregoing term "embedded" means that the frame member 2 is integrated with the expanded bead article 3 in the expanded bead article 3. The integration includes not only a state in which the frame member 2 is closely surrounded by the expanded bead article 3 but also a state in which the frame member 2 is surrounded by the expanded bead article 3 with an air gap (or space) left partially or entirely around the frame member 2. The entire axial length of the frame member 2 does not necessarily need to be embedded in the expanded bead article 3 but a portion of the frame member 2 may be exposed to outside from the expanded bead article 3, for example, as illustrated in FIG. 2. From the viewpoint of strength of the seat core material 1, the exposed portion of the frame member 2 (the portion of the frame member 2 exposed from the expanded bead article 3) is preferably 50% or less of the entire length of the frame member 2, more preferably 30% or less.

The frame member 2 embedded in the expanded bead article 3 is restricted in motion by the expanded bead article 3 in a direction approximately perpendicular to both the shrinkage direction of the expanded bead article 3 and the axial direction of the frame member 2. Therefore, the frame member 2 is preferably embedded in the expanded bead article 3 in such a manner as to be movable with respect to the shrinkage of the expanded bead article 3. For example, when the shrinking force of the expanded bead article 3 applied to the frame member 2 acts mainly in the vehicle-width direction of the seat core material, the frame member 2 is preferably embedded in the expanded bead article 3 such that the frame member 2 is sandwiched in the expanded bead article 3 at a position perpendicular to the vehicle-width direction of the frame member 2. In addition, the frame member 2 is further preferably supported by the expanded bead article 3 from the vertical direction.

In a state in which the seat core material 1 is mounted in a vehicle such as an automobile, the front frame part 21 in the frame member 2 refers to a part of the frame member 2 that is equivalent to a front seat part on the front side of the automobile and the rear frame part 22 in the frame member 2 refers to a part of the frame member 2 that is equivalent to a rear seat part. In a state in which the seat core material 1 is mounted in a vehicle such as an automobile, the vehicle-width direction refers to a right-left direction of the automobile and will also be called simply width direction. In a state in which the seat core material 1 is mounted in a vehicle such as an automobile, the vertical direction refers to a vertical low-top direction of the automobile.

The seat core material 1 preferably has an approximately rectangular shape or an approximately square shape as viewed from top. As illustrated in FIG. 1, the seat core material 1 is preferably thick at a front part and thin at a rear part. In the thus structured seat core material 1, the volume of the expanded bead article 3 is larger at a seating portion on the front frame part 21 side than at a seating portion on the rear frame part 22 side, and thus the shrinkage amount of the expanded bead article 3 is larger at the seating portion on the front frame part 21 side than at the seating portion on the rear frame part 22 side. In the front frame part 21, the frame member 2 is embedded to a lower surface side of the seat core material 1 from the viewpoint of mounting in a vehicle. When the frame member 2 is arranged in the seat core material 1 in this manner, after being removed from the mold, a center portion of the expanded bead article 3 on the rear frame part 22 side is stretched to the front side in particular, along with the shrinkage of the expanded bead article 3 on the front frame part 21 side, and the rear frame part 22 side of the expanded bead article 3 becomes likely to deform in a V shape as a whole. For example, on the rear frame part 22 side, the expanded bead article 3 deforms forward at width-wise end portions. The center portion of the expanded bead article 3 deforms forward more greatly than the end portions. Therefore, the seat core material 1 entirely deforms in a V shape as viewed from top. When the frame member 2 is embedded in the thick front frame part 21 at a position leaning to a thickness direction, the direction of shrinkage becomes three-dimensional and the deformation becomes further complicated. In the seat core material 1 of the present invention, in particular, a thickness Tf of a front end portion of the seat core material 1 and a thickness Tr of a rear end portion of the seat core material 1 are preferably in the relationship $Tr \times 1.5 < Tf$, further preferably $Tr \times 1.7 < Tf$.

The seat core material 1 of the present invention has at least the two or more lightening parts 7 in an area from the center portion to the rear side of the expanded bead article 3. Specifically, the lightening parts 7 are formed between the side frame parts 23 on both ends in an area from the center portion as seen in the front-back direction to the rear frame part 22 side of the expanded bead article 3. The lightening parts 7 may be simply formed thinner than the surrounding expanded bead article 3 but are preferably formed as through holes penetrating the expanded bead article 3 from the top surface to the bottom surface. In addition, the continuous part 8 is formed as a part of the expanded bead article 3 between the two or more lightening parts 7. The continuous part 8 is adjacent to the lightening parts 7 such that the rear frame part 22 side and the front frame part 21 side are continuous in the front-back direction. The lightening parts 7 are formed in the expanded bead article 3 for the purpose of lightening or parts attachment, for example.

Figure 7:
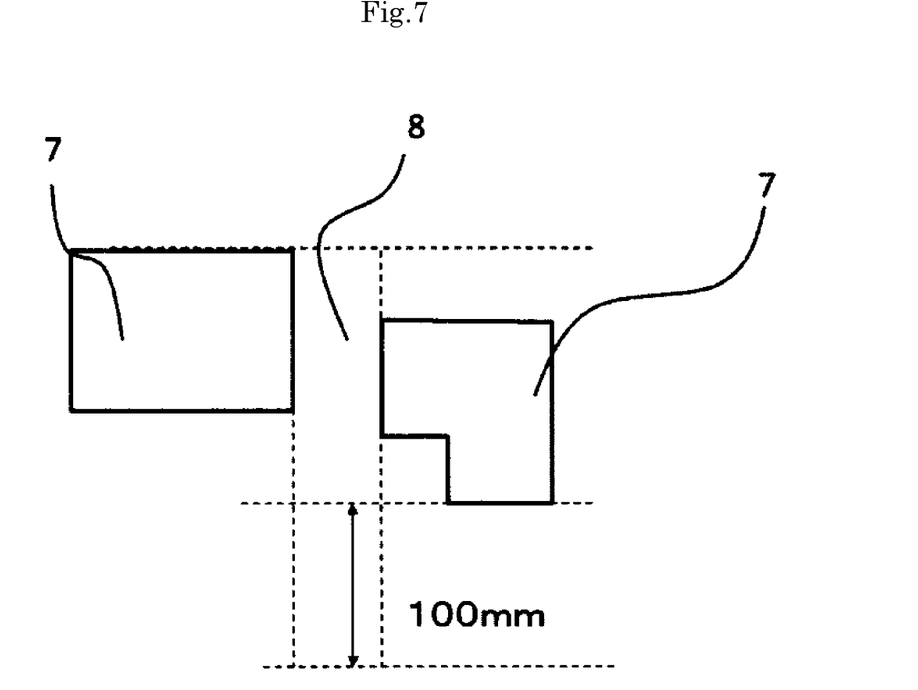
FIG. 7 is a schematic diagram illustrating two lightening parts and a continuous part.

There is no particular limitation on the shape of the lightening parts 7, and the two or more lightening parts 7 may be different in shape. As illustrated in FIG. 7, when front-back end portions of the two lightening parts 7 are provided at different positions, an area between two front and back lines extended along the width direction with reference to foremost and rearmost portions of the two lightening parts 7 constitutes the continuous part 8. In addition, a part sandwiched between lines extended in the front-back direction with reference to the endmost portion of the lightening parts 7 on the continuous part 8 side sandwiched between the lightening parts 7 constitutes the continuous part 8. The foregoing area is decided with reference to the continuous part 8 decided by the foregoing line segments.

For example, when the two lightening parts 7 are formed between the side frame parts 23, one continuous part 8 is provided between the lightening parts 7. When three lightening parts 7 are formed, two continuous parts 8 are provided accordingly.

The lightening parts 7 are preferably formed at least between the side frame parts 23 and between the rear frame part 22 and the front frame part 21, and have a space penetrating the expanded bead article 3 from the top surface to the bottom surface. However, each of the lightening parts 7 may be formed such that a through space is continuous on the outer side of the rear frame part 22 and the side frame parts 23. For example, when the two lightening parts 7 are formed on the both end portions of the seat core material 1 such that the seat core material 1 on the rear-side both ends are removed at the corner portions, the continuous part 8 is formed inside the lightening parts 7.

In the continuous part 8 of the expanded bead article 3 that is continuous between the rear frame part 22 side and the front frame part 21 side, the influence of the shrinkage of the front part of the expanded bead article 3 is transferred to the rear side. On the other hand, in the lightening parts 7, the expanded bead article 3 is non-continuous in the front-back direction where the influence of the shrinkage is not transferred.

Thus, in the present invention, the slit 4 is vertically formed in the expanded bead article 3 in the continuous part 8 or in an area in front of the continuous part 8, extending in the width direction of the expanded bead article 3. With the slit 4 formed in the continuous part 8 or the area in front of the continuous part 8 of the expanded bead article 3, it is possible to reduce transfer of the influence of shrinking force generated on the front side of the expanded bead article 3 to the rear side. As a result, the deformation of the seat core material 1 can be effectively suppressed, whereby the seat core material 1 has sufficient strength and a sense of unity and is excellent in dimension stability. The foregoing area ranges from the front side of the continuous part 8 over a distance 100 mm or less. The upper limit of the range of the area from the front side of the continuous part 8 is preferably 80 mm, more preferably 60 mm. On the other hand, the foregoing area preferably ranges from the front side of the continuous part 8 over a distance of 3 mm or more, more preferably 5 mm or more. At least the rear end portion of the slit 4 is formed in the area.

The slit 4 does not need to completely block the continuous part 8 in the front-back direction but the slit 4 preferably has a width of 50% or more of the width of the continuous part 8, preferably a width of 70% or more. The slit 4 is closed at the both longitudinal ends and has at least end portions.

For example, when the slit 4 is formed in the continuous part 8 sandwiched between the lightening parts 7, the slit 4 is formed with a gap left between the lightening parts 7 and the end portions of the slit 4. In this case, since the both end portions of the slit 4 are closed, the slit 4 is not continuous with the lightening parts 7 but the gap is left between the both end portions of the slit 4 and the lightening parts 7.

As illustrated in FIG. 7, when the continuous part 8 is formed by displacing the two lightening parts 7 in the front-back direction, the continuous part 8 may have a portion where the lightening part 7 is formed on one side and the lightening part 7 is not formed on the other side as opposite side as seen in the vehicle-width direction. In the case of forming the slit 4 in this portion, the slit 4 is preferably formed with a gap left at least between one end portion of the slit 4 and the lightening part 7. In addition, on the other side of the slit 4, the slit 4 is preferably formed in the entire continuous part 8.

In the case of forming the slit 4 in an area in front of the continuous part 8 of the expanded bead article 3, the both end portions of the slit 4 may be formed within the area, one end portion of the slit 4 may be formed within the area, or the both end portions of the slit 4 may be formed outside the area. However, the slit 4 is preferably formed in the entire area and has the both end portions outside the area.

In the case of forming the slit 4 in the area in front of the continuous part 8, the slit 4 is preferably formed along the entire continuous part 8 with a space of 5 to 100 mm left in front of the lightening parts 7. In addition, the slit 4 and the lightening part 7 preferably partially overlap together as viewed from the front. Specifically, the slit 4 is preferably extended 5 mm or more from the area in front of the continuous part 8. The end portions of the slit 4 are preferably formed at positions distant 5 mm or more from the area in the vehicle-width direction, more preferably 10 mm or more, further preferably 20 to 200 mm.

When there is a plurality of continuous parts 8, the slit 4 may not be formed in all the continuous parts 8 or in the corresponding places in front of the continuous parts 8. The slit 4 is formed for at least the continuous parts 8 at positions corresponding to the seating portion or center portion of the expanded bead article 3 inside the seat core material 1.

In addition, there is no particular limitation on a length (m) of the slit 4 as seen in the longitudinal direction of the side frame parts 23, in other words, a length (m) of the slit 4 in the front back direction of the seat core material 1. Although the slit 4 may be a simply cut slit 4 and a slit 4 with a front-back length (m) of about 60 mm, the front-back length (m) of the slit 4 is preferably 3 to 50 mm from the viewpoint of strength of the seat core material 1.

The slit 4 can be formed using a tool such as a cutter at the corresponding place in the expanded bead article immediately after the in-mold molding of the expanded beads and before shrinkage. The slit 4 can also be formed at the same time as the molding of the expanded bead article 3 by using a molding mold capable of forming the slit 4. In the case of forming the slit 4 using by the molding mold, the front-back length of the slit 4 is preferably 3 to 40 mm, more preferably 5 to 30 mm. The slit 4 may penetrate the expanded bead article 3 or may not penetrate the expanded bead article 3 as far as the slit 4 can suppress the shrinkage. From the viewpoint of effectively preventing the shrinkage, the slit 4 is preferably formed at a depth of up to 50% or more of the thickness of the expanded bead article 3, and more preferably formed at a depth of up to 80% or more of the thickness of the expanded bead article 3. The slit 4 preferably penetrates the expanded bead article 3. When the slit is a bottomed hole, the slit 4 may be opened upward or may be opened downward.

When the two continuous parts 8 are formed by the three lightening parts 7 in the expanded bead article 3, the slit 4 is preferably formed in each of the areas in front of the continuous parts 8 as illustrated in FIG. 2, for example. In addition, the slit 4 is preferably formed in the expanded bead article 3 so as to be intermittent in the width direction.

In this case, as illustrated in FIGS. 4(A) to 4(D), for example, since the two slits 4 are intermittently arranged in the width direction between the side frame parts 23, an intermittent part 9 is formed between the width-wise inner end portions of the slit 4. The slits 4 are preferably formed in a linear fashion with the intermittent part 9 therebetween.

There is no particular limitation on the formation positions of the slits 4 as far as the slits 4 are formed at least in the continuous parts 8 or in areas in front of the continuous parts 8 and have end portions. For example, the end portions of the slits 4 may be in contact with the side frame parts 23 so that the side frame parts 23 are partially exposed. However, from the viewpoint of strength of the seat core material 1, the expanded bead article 3 preferably has portions without the slits 4 between the width-wise outer end portions of the slits 4 and the side frame parts 23.

At the intermittent part 9, the seat core material 1 is continuous by the expanded bead article 3 in the front-back direction, and thus the intermittent part 9 improves a sense of unity such as strength of the seat core material 1. On the other hand, the intermittent part 9 can also be said to be a portion of the expanded bead article 3 that makes continuous the seat core material 1, which causes the influence of the shrinkage of the expanded bead article 3 in the front-back direction.

Figure 4:
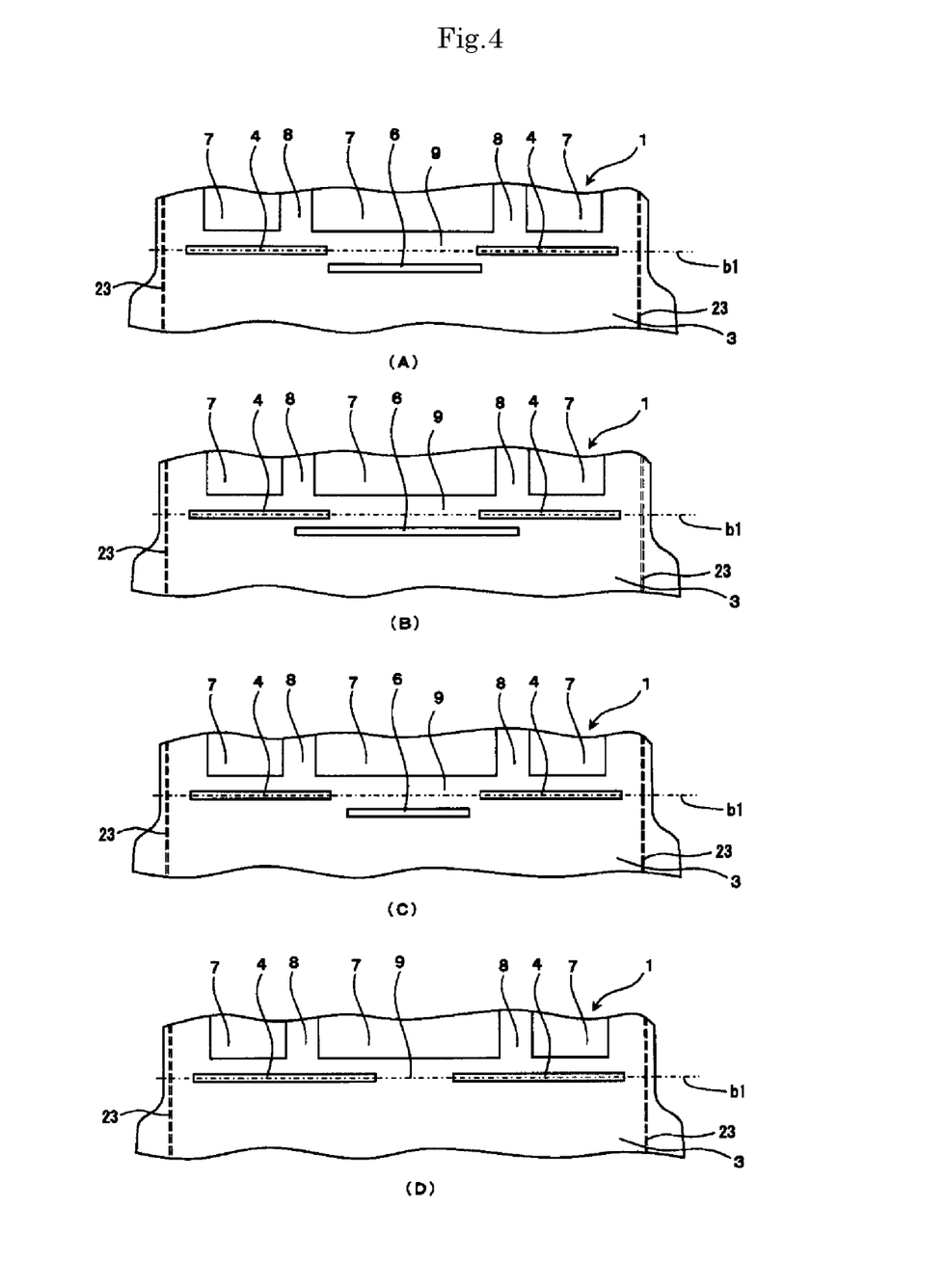
FIG. 4 is a schematic diagram of a slit.

Thus, in the seat core material 1 of the present invention, as illustrated in FIGS. 4(A) to 4(C), an auxiliary slit 6 may be provided in the width direction in front and/or in back of the portion of the expanded bead article 3 without the slit 4 on the extension of the slit 4 as seen in the width direction. The auxiliary slit 6 is preferably provided in parallel to the slit 4. The phrase "in parallel to the slit 4" here means that the auxiliary slit 6 is approximately in parallel to the extension of the slit 4 as seen in the width direction.

On the other hand, when the slits 4 are formed in an area in front of the continuous part 8 between the lightening parts 7 over a distance 100 mm or less, at least one auxiliary slit 6 with both ends closed is preferably provided adjacent to the slits 4 in front and/or in back of a portion of the expanded bead article 3 without the slits 4 on the extension of the slits 4 as seen in the width direction, in such a manner as to penetrate the expanded bead article 3 from the top surface to the bottom surface. The auxiliary slit 6 is preferably provided in front of the slits 4.

For example, as illustrated in FIGS. 4(A) to 4(C), when the three lightening parts 7 are formed in the seat core material 1 and the two continuous parts 8 are formed between the lightening parts 7, and when the slit 4 is formed in each of the areas in front of the two continuous parts 8, the auxiliary slit 6 penetrating the expanded bead article 3 from the top surface to the bottom surface can be provided adjacent to the slits 4 in front and/or in back of the intermittent part 9 as the portion without the slits 4 on the extension of each of the slits 4 as seen in the width direction.

The slits 4 and the auxiliary slit 6 are preferably formed to partially overlap in the front-back direction at adjacent positions on the front side. Further, the slits 4 and the auxiliary slit 6 are preferably formed to have portions where the slits are in parallel to each other. For example, in the case illustrated in FIG. 4(B), the end portions of the auxiliary slit 6 are located more outside than the end portions of the slits 4 such that these slits are partially in parallel to each other. In particular, the length of the overlap between each of the slits 4 and the auxiliary slit 6 as seen in the front-back direction is preferably 0 to 200 mm, more preferably 10 to 150 mm.

With the thus formation of the auxiliary slit 6, the intermittent part 9 is blocked by the auxiliary slit 6 as seen from the front-back direction, which makes the intermittent part 9 less prone to come under the influence of the shrinkage in the front-back direction.

In addition, when the auxiliary slit 6 is formed as described above, the portion without the slits 4 and the auxiliary slit 6 has a bending structure formed by these slits. The bending portion exerts elastic force in the front-back direction due to bending deformation, thereby to further absorb the shrinking force and impact force applied in the front-back direction. The longer the overlapping portion is, the more pronounced the bending structure becomes, thereby to reduce the deformation amount of the seat core material.

Figure 5:
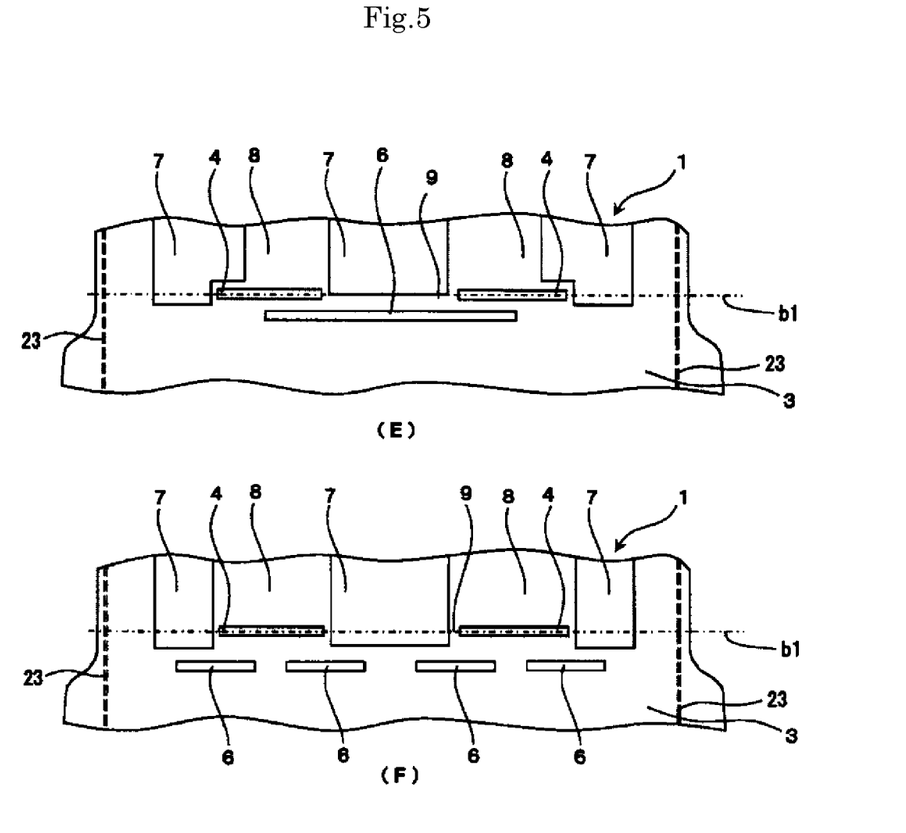
FIGS. 5(E) and 5(F) are schematic diagrams illustrating shapes of slits in other embodiments.

On the other hand, when the slits 4 are formed in the continuous parts 8, the auxiliary slit 6 with both ends closed is preferably provided along the width direction in front of the portion without the slits 4 on the extension of each of the slits 4 in the width direction, in such a manner as to penetrate the expanded bead article 3 from the top surface to the bottom surface. For example, as illustrated in FIG. 5(E), when the slits 4 are formed in the continuous parts 8, at least one auxiliary slit 6 penetrating the expanded bead article 3 from the top surface to the bottom surface is preferably in front of the portion without the slits 4 on the extension of each of the slits 4 as seen in the width direction and in the area described above. The auxiliary slit 6 may be provided at each of the corresponding places in the plurality of continuous parts 8 or may be provided continuously in the width direction. When the auxiliary slit 6 is provided at least in front of the portion without the slits on the extension of each of the slits 4 as seen in the width direction and in the area described above, the auxiliary slit 6 can be extended up to the outside of the area described above in the vehicle-width direction.

The auxiliary slit 6 may be intermittently formed as illustrated in FIG. 5(F). In the example of FIG. 5(F), each of the slits 4 is formed in the continuous part 8 sandwiched between the lightening parts 7, and a gap exist between the slit 4 and the lightening parts 7. The consecutiveness of the continuous parts 8 in the front-back direction is almost interrupted by the slits 4 but each of the continuous parts 8 is consecutive in the front-back direction at the portion without the slit on the extension of the slit 4 as seen in the width direction, and thus the auxiliary slit 6 is preferably provided in the area in front of the gaps.

Forming the auxiliary slit 6 as described above makes it possible to reduce the influence of the shrinking force transferred in the front-back direction to the portion without the slits 4 on the extension of each of the slit 4 in the width direction and the intermittent part 9. This effectively prevents the expanded bead article 3 on the rear frame part 22 side from being stretched to the front side along with the shrinkage of the expanded bead article 3 on the front frame part 21 side that would result in the entire deformation of the seat core material 1 in the V shape. Therefore, the auxiliary slit 6 is preferably formed in at least the portion without the slits 4 and in the intermittent part 9 inside the seat core material 1.

The auxiliary slit 6 is preferably formed at a position adjacent to the slits 4 in front of the slits 4, the slits 4 and the auxiliary slit 6 are preferably formed with a spacing of 5 to 100 mm left therebetween in the front-back direction. The spacing between the auxiliary slit 6 and the adjacent slits 4 as seen in the front-back direction is preferably 10 to 70 mm, further preferably 15 to 50 mm, and most preferably 20 to 40 mm. With the spacing within the foregoing range, the seat core material 1 is excellent in a sense of unity while reducing a change in the dimensions of the seat core material 1.

Figure 6:
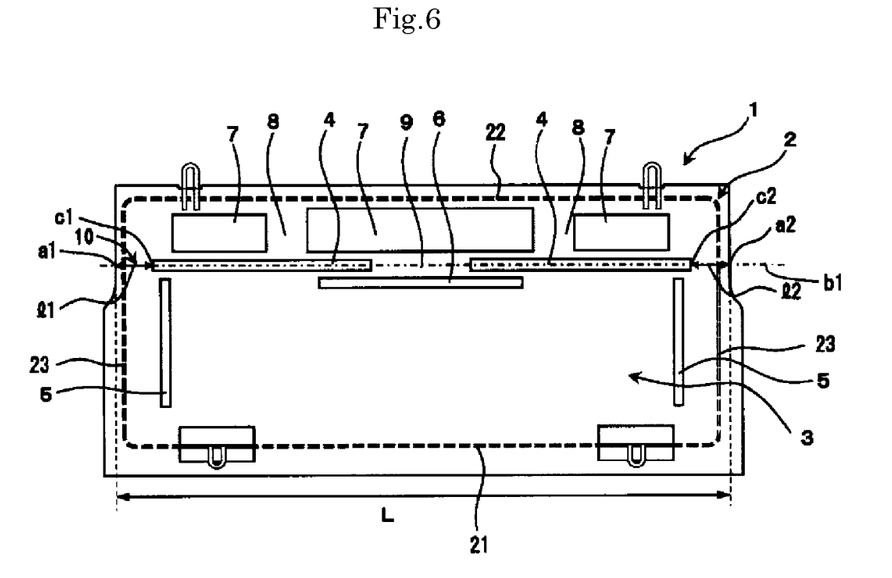
FIG. 6 is a schematic diagram illustrating an embodiment in which cut parts are formed along side frame parts.

A coupling part 10 without slits such as the slit 4 or an outer slit described later is preferably provided at the width-wise end portion of the expanded bead article 3 as illustrated in FIG. 6. A ratio (l/L) of a width-wise length (l) of the coupling part 10 as the part without slits from the end portion of the expanded bead article 3 to the outer end portion of the slit to a width-wise length (L) of a portion of the expanded bead article 3 with the coupling part 10 is preferably within a range of 0.02 to 0.2 on one side. At the peripheral edge of the seat core material 1 illustrated in FIG. 2, the coupling part 10 as a part without slits is formed on both sides as seen in the width direction and both of the parts preferably satisfy the foregoing range.

When the ratio (l/L) is within the foregoing range, there exists no slit on the width-wise both end portions of the seat core material 1, and thus the seat core material has a small dimension change and is excellent in strength and a sense of unity. The ratio (l/L) is more preferably within 0.05 to 0.15.

The ratio (l/L) of the width-wise length (l) of the coupling part 10 to the width-wise length (L) of the portion of the expanded bead article 3 where the coupling part 10 is located can be specifically measured as described below. As illustrated in FIGS. 2 and 6, in front-back center portions (a1 and a2) on both ends of outer edges of the slits 4, a straight line (b1) is drawn in the width direction of the expanded bead article 3 and the straight line portion (b1) is set as a slit 4 formation portion. Then, the length L of the straight line (b1) between the both end portions (a1 and a2) of the expanded bead article 3 is measured. Meanwhile, assuming that each of lengths $l_1$ and $l_2$ on the straight line from the end portions (a1 and a2) of the expanded bead article 3 to the both end portions (c1 and c2) of the slit 4 is designated as l, the ratio (l/L) is calculated on one side.

There is no particular limitation on the formation positions of the coupling parts 10 as far as the coupling parts 10 are located at the width-wise outer end portions of the expanded bead article 3. However, the coupling parts 10 are preferably formed in a range from the front-back center portion of the expanded bead article 3 to the rear frame part 22. Forming the coupling parts 10 at positions in the range from the center portion of the expanded bead article 3 to the rear frame part 22 improves the strength and the sense of unity of the seat core material 1.

The coupling parts 10 including the expanded bead article 3 can be provided on the width-wise outer sides of the lightening parts 7 on the width-wise outer sides of the seat core material 1 and outer slits can be provided in the width direction in the coupling parts 10 or in front of the coupling parts 10 in such a manner as to penetrate the expanded bead article 3 from the top surface to the bottom surface. The outer slits are preferably formed inside the annular frame member 2. The outer slits can be made continuous with the slits 4. The shape and size of the outer slits are preferably similar to those of the slits 4.

The slits 4, the outer slits, and the auxiliary slit 6 are preferably formed at a portion of 50 to 90% from the front end portion of the expanded bead article 3 with respect to a front-back length (M) of the center portion of the expanded bead article 3, more preferably at a portion of 60 to 80%. Forming the slits within the foregoing range makes it possible to effectively relieve the influence of shrinking force of the expanded bead article 3 on the front frame part 21 side that is thick and is relatively large in volume, and to reduce a change in the dimensions of the rising portion of the rear side likely to become deformed, so that the seat core material 1 can have a sense of unity. The slits 4, the outer slits, and the auxiliary slit 6 are preferably provided in an area in front of the rising portion of the rear side from the seating portion of the seat core material 1.

The outer slits and the auxiliary slit 6 are through slits as described above. However, the outer slits and the auxiliary slit 6 may be non-through slits as far as these slits do not deteriorate the advantageous effects of the present invention. Therefore, each of the slits 4, the outer slits, and the auxiliary slit 6 may have a portion not penetrating the expanded bead article 3 in the vertical direction.

In top view of the seat core material 1, the opening area of the slits 4, the total opening area of the slits 4 and the auxiliary slit 6, or the total opening area of the slits 4, the auxiliary slit 6, and the outer slit with respect to the projection area of the expanded bead article 3 is preferably 5% or less. Setting the opening area of the slits within the foregoing range makes it possible to sufficiently prevent deformation, thereby further providing the seat core material 1 with a sense of unity and strength. From the foregoing viewpoint, the total opening area of the slits 4, the auxiliary slit 6, and the outer slits is preferably 3% or less. The lower limit of the opening area is generally 0.5%, preferably 0.7% or more.

Figure 3:
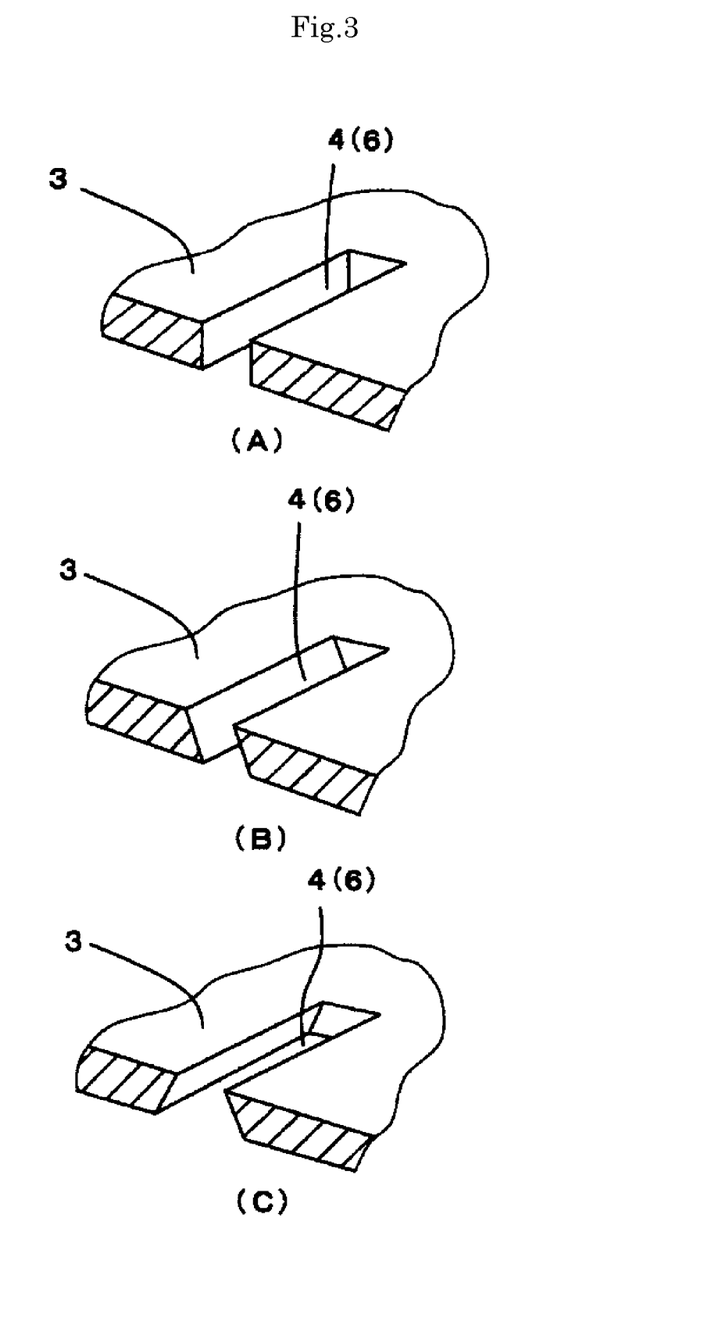
FIG. 3 is a cross-sectional view of a slit.

Further, in the present invention, the depth direction of the slits 4, the outer slits, and the auxiliary slit 6 or the penetration direction of these slits as through slits can be made vertical to the perpendicular direction in a mounted state of the seat core material 1 as illustrated in FIG. 3(A) or can be made inclined to the perpendicular direction in a mounted state of the seat core material 1. Specifically, the shape of a slit cross section of the slits 4 or the auxiliary slit 6 cut in the front-back direction can be a parallelogrammatic cross section as illustrated in FIG. 3(B) or a trapezoidal cross section as illustrated in FIG. 3(C). Making the depth direction of the slits 4, the outer slits, and the auxiliary slit 6 inclined with respect to the perpendicular direction in a mounted state of the seat core material 1 in this manner makes it possible to adjust the opening positions and opening areas of the slits 4, the outer slits, and the auxiliary slit 6 in the upper surface of the seat core material 1.

In particular, inclining the penetration direction of the slits 4 such that the front-back side walls of the slits 4 are almost parallel is more effective in distributing the front-back shrinking force and impact force to the vertical direction, whereby the seat core material 1 can be more preferably used. The penetration direction of the slits 4, the outer slits, and the auxiliary slit 6 refers to a line connecting the front-back center of the slit at the opening portion from the top surface to the bottom surface. Forming the cross section of the slit orthogonal to the width direction in a trapezoidal shape provides an advantage that, when a seat is produced from the seat core material 1 together with urethane, the urethane is easy to fix.

In addition, in the seat core material 1 of the present invention, an incision part 5 can be formed inside the side frame parts 23 of the expanded bead article 3 from the top surface in the thickness direction and the front-back direction. The number of the incision part 5 may be one or more. The incision part 5 may be formed along the side frame parts 23 and adjacent to the inside of the side frame parts 23 or may be formed at the center portions of the side frame parts 23. Specifically, the incision part 5 is preferably formed in the front-back direction as illustrated in FIGS. 1 and 6, for example. The width of the incision part 5 (the right-left length) is preferably 10 to 30 mm, and the front-back length of the incision part 5 is preferably 50 to 200 mm.

Forming the incision part 5 together with the slits 4 makes it possible to relieve the shrinkage in the width direction and further suppress the deformation of the seat core material 1, thereby providing the seat core material 1 with a sense of unity and strength. The incision part 5 is preferably provided from the top surface to the thickness direction of the article up to about 50% of the thickness of the expanded bead article 3, more preferably 80% or more. Further preferably, the incision part 5 penetrates the expanded bead article 3. The incision part 5 can be formed such that a through portion and a non-through portion are combined unless the foregoing advantageous effect is deteriorated.

In addition, the seat core material 1 of the present invention may have a penetration space or a concave portion at places other than the lightening parts 7, the slits 4, the auxiliary slit 6, and the incision part 5 for the purposes of weight reduction or connection with other parts, without deteriorating a sense of unity and strength as objects of the present invention.

The seat core material 1 of the present embodiment is produced using a molding mold in which convex portions for forming the slits 4 and the auxiliary slit 6 are placed between the portions for forming the side frame parts 23. While the annular frame member 2 is disposed at a predetermined position in the molding mold, primarily expanded beads are charged into the molding mold and heating steam is introduced into the mold. Then, the expanded beads in the mold is heated for secondary foaming and the surface of the expanded beads is molten. Accordingly, integrated with the annular frame member 2, the expanded bead article 3 can be obtained by in-mold molding. In the seat core material 1 formed under a predetermined condition, the expanded bead article 3 starts to shrink from the stage of removal from the mold. However, the slits 4, the outer slits, and the auxiliary slit 6 formed by the mold relieve the influence of shrinkage of the expanded bead article 3 and suppresses the deformation.

Instead of the slit formation method using a mold described above, the seat core material 1 can be formed using a conventional mold without a structure for forming the slits 4, the outer slits, and the auxiliary slit 6 so that, in an early stage after the removal from the mold, the slits 4, the outer slits, and the auxiliary slit 6 are formed by a method such as cutting. To form the slits by cutting work, the slits are preferably processed within 60 minutes after the removal from the mold, more preferably within 30 minutes, further preferably within 15 minutes.

EXAMPLES

Hereinafter, the seat core material of the present invention will be specifically described with reference to examples. However, the present invention is not limited to the examples.

Example 1

An annular frame member produced from an iron wire material with a diameter of 4.5 mm and a tensile strength (JIS G3532 SWM-B) of 500 N/mm$^2$ was disposed at a predetermined position in an automobile seat core material molding mold (1050 mm wide, 550 mm long, and 200 mm thick at maximum (100 mm thick at a front end portion and 50 mm thick at a rear end portion)). Then, polypropylene expanded beads (at an appearance density of 0.024 g/cm$^3$) in the molding mold and subjected to insert molding by steam heating, thereby molding a seat core material of the shape illustrated in FIG. 2.

In the steam heating, first, preliminary heating (exhaust process) is performed such that steam is supplied for five seconds into the mold in which drain valves on both sides of the mold were opened. After that, one-side heating was carried out under a pressure lower 0.08 MPa (G) than a molding steam pressure of 0.3 MPa (G), and then carried out from the opposite direction under a pressure lower 0.04 MPa (G) than the molding steam pressure. Then, main heating was carried out from the both sides under the molding steam pressure. After completion of the heating, the mold was released from the pressure, air-cooled for 30 seconds, and water-cooled for 240 seconds, thereby obtaining a seat core material. The article density of the seat core material was 0.03 g/cm$^3$.

The seat core material 1 includes the expanded bead article 3 and the annular frame member 2 embedded in the peripheral edge portion of the expanded bead article 3. The annular frame member 2 forms a rectangular annular frame including the front frame part 21, the rear frame part 22, and the two side frame parts 23 coupling the front frame part 21 and the rear frame part 22. The three lightening parts 7 are formed between the side frame parts 23 at the both end portions and the center portion in a range from the front-back center portion of the expanded bead article 3 to the rear frame part 22, and the two continuous parts 8 are provided between the lightening parts 7 such that the front frame part 21 and the rear frame part 22 are made continuous.

Then, within ten minutes after the molding, as illustrated in FIG. 4(A), the one each rectangular slit 4 with a seat width-direction length of 250 mm and a front-back length of 10 mm on the right and left side, that is, the total two slits 4 were formed by a cutter knife in a linear fashion in the width direction at a position of 400 mm from the front portion (an area in front of the lightening parts 7 over a distance of 10 mm) and at a position of 140 mm from the vehicle width-wise end portion. The two slits 4 were formed in the area in front of the continuous parts 8 sandwiched between the three lightening parts 7. The one rectangular auxiliary slit 6 with a seat width-direction length of 270 mm and a front-back length of 10 mm was formed by a cutter knife at a position of 360 mm from the front portion in the intermittent part 9 between the slits 4 in the center portion of the seat core material. The slits were formed such that the central-side end portions of the right and left slits 4 and the end portions of the auxiliary slit 6 are in contact with each other as seen from the front-back direction. Therefore, the slits penetrating the expanded bead article 3 from the top surface to the bottom surface are oriented to the vehicle-width direction in front of the continuous parts 8 sandwiched between the lightening parts 7. The two slits 4 are intermittently formed in a linear fashion in front of the continuous parts 8 in the vehicle-width direction of the expanded bead article 3. The auxiliary slit 6 is provided in the vehicle-width direction in parallel to the slits 4, adjacent in front of the intermittent parts of the slits 4.

Example 2

In a manner similar to the Example 1, a seat core material with no slits was molded. Within ten minutes after the molding, as illustrated in FIG. 4(B), the one each rectangular slit 4 with a seat width-direction length of 250 mm and a front-back length of 10 mm on the right and left side, that is, the total two slits 4 were formed by a cutter knife in the expanded bead article 3 between the side frame parts 23 in the width direction at a position of 400 mm from the front portion (an area in front of the lightening parts 7 over a distance of 10 mm) and at a position of 140 mm from the vehicle width-wise end portion. The slits 4 were formed in front of the two continuous parts 8 sandwiched between the three lightening parts 7. The one rectangular auxiliary slit 6 with a seat width-direction length of 500 mm and a front-back length of 10 mm was formed by a cutter knife at a position of 360 mm from the front portion in the center portion of the expanded bead article 3. The slits were disposed such that the right and left slits 4 and the central auxiliary slit 6 overlapped 135 mm as seen from the front-back direction.

Example 3

In a manner similar to the Example 1, a seat core material with no slits was molded. Within ten minutes after the molding, as illustrated in FIG. 4(C), the one each rectangular slit 4 with a seat width-direction length of 250 mm and a front-back length of 10 mm on the right and left side, that is, the total two slits 4 were formed by a cutter knife in the expanded bead article 3 between the side frame parts 23 in the width direction at a position of 400 mm from the front portion (an area in front of the lightening parts 7 over a distance of 10 mm) and at a position of 140 mm from the vehicle width-wise end portion. The slits 4 were formed in front of the two continuous parts 8 sandwiched between the three lightening parts 7. The one rectangular auxiliary slit with a seat width-direction length of 210 mm and a front-back length of 10 mm was formed by a cutter knife at a position of 360 mm from the front portion in the center portion of the expanded bead article 3. The slits were disposed such that the right and left slits and the central slit did not overlap but were separated from each other with a space of 30 mm therebetween.

Example 4

In a manner similar to the Example 1, a seat core material with no slits was molded. Within ten minutes after the molding, as illustrated in FIG. 4(D), the one each rectangular slit 4 with a seat width-direction length of 250 mm and a front-back length of 10 mm on the right and left side, that is, the total two slits 4 were formed by a cutter knife in the expanded bead article 3 between the side frame parts 23 in the width direction at a position of 400 mm from the front portion.

Comparative Example 1

In a manner similar to the Example 1, a seat core material with no slits was molded. No slits were formed in the molded seat core material.

Comparative Example 2

In a manner similar to the Example 1, a seat core material with no slits was molded. Within ten minutes after the molding, the one rectangular slit 4 with a seat width-direction length of 1050 mm and a front-back length of 10 mm was formed by a cutter knife at a position of 360 mm from the front portion in such a manner as to cross the side frame parts 23. The slit was formed such that the seat core material was completely partitioned by the slit 4 and had both end portions not closed.

The seat core materials in the Examples 1 to 3 and the Comparative Examples 1 and 2 produced under the conditions described above were cured for 12 hours at an atmosphere of 60° C. and slowly cooled. Then, the seat core materials were measured in the amount of a dimension change of the rear-side center portion and the amounts of dimension changes of the both rear-side end portions. The dimension change amounts (mm) were measured such that the change of the dimension measurement position to the front side was minus and the change of the dimension measurement position to the rear side was plus. The difference in the dimension change amounts (the dimension change amount of the center portion—the dimension change amounts of the both end portions) was regarded as deformation amount. The dimension as a reference of a dimension change amount was the dimension of the seat core material at the designed measurement position. When the minus deformation amount is large, the difference in the dimension change amounts between the rear-side end portion and the center portion of the seat core material is large. This means that the rear-side center portion is shrunk to the front side to cause a large distortion.

The samples formed by curing the seat core materials in the Examples 1 to 4 and the Comparative Examples 1 and 2 produced under the conditions described above for 12 hours under an atmosphere of 60° C. and slowly cooling, were evaluated for a sense of unity as follows:

A: No handling trouble occurs when only an end portion of the seat core material is held.

B: The seat core material may become warped when only an end portion of the seat core material is held.

TABLE 1

|  | Example 1 | Example 2 | Example 3 | Example 4 | Comparative Example 1 | Comparative Example 2 |
| --- | --- | --- | --- | --- | --- | --- |
| Slit length (mm) | 250 + 250 | 250 + 250 | 250 + 250 | 250 + 250 | 0 | 1050 |
| Slit front-back length (mm) | 10 | 10 | 10 | 10 | 0 | 10 |
| Auxiliary slit length (mm) | 270 | 500 | 210 | 0 | 0 | 0 |
| Auxiliary slit front-back length (mm) | 10 | 10 | 10 | 0 | 0 | 0 |
| Ratio (I/L) | 0.13 | 0.13 | 0.13 | 0.13 | — | — |
| Slit formation position | 65-73% | 65-73% | 65-73% | 73% | — | 73% |
| Slit opening area | 1.3% | 1.7% | 1.2% | 0.9% | — | 1.8% |
| Deformation amount (mm) | −3 | −1.5 | −4 | −6 | −8 | −1 |
| Sense of unity evaluation | A | A | A | A | A | B |

According to the results in Table 1, the deformation amount of the seat core material with the slits in each of the Examples 1 to 4 was smaller than the deformation change of the seat core material in the Comparative Example 1. The seat core material in the Example 2 with the bending structure had a smaller deformation amount. The seat core material in the Comparative Example 2 had a small deformation amount but was lack of a sense of unity.

These results have revealed that the seat core material of the present invention is excellent in dimension accuracy with front-back deformation suppressed.

The invention claimed is:

1. A seat core material for vehicle comprising:
a thermoplastic resin expanded bead article; and
a frame member embedded in a peripheral edge portion of the expanded bead article, wherein
the expanded bead article has two or more lightening parts in an area from a center portion as seen in a front-back direction to a rear side,
a through or non-through slit is provided in a continuous part between the lightening parts or an area in front of the continuous part over a distance of 100 mm or less along a vehicle-width direction of the expanded bead article, and
the slit is closed at both longitudinal ends.

2. The seat core material according to claim 1, wherein an opening area of the slit is 5% or less of a projection area of the expanded bead article in top view of the seat core material in a mounted state.

3. The seat core material according to claim 2, wherein the frame member is annular, and
the frame member is embedded in the peripheral edge portion of the thermoplastic resin expanded bead article.

4. The seat core material according to claim 1, wherein the frame member is annular, and
the frame member is embedded in the peripheral edge portion of the thermoplastic resin expanded bead article.

5. The seat core material according to claim 1, wherein
the expanded bead article has the two or more continuous parts,
the expanded bead article has the slit in each of areas in front of the two or more continuous parts over a distance of 100 mm or less, and
the slit is arranged to form an intermittent part in a vehicle-width direction.

6. The seat core material according to claim 5, wherein an auxiliary slit is formed in parallel to the slit in front of the intermittent part in a vertical direction of the expanded bead article.

* * * * *